Oct. 16, 1951 — L. H. SNYDER — 2,571,389
HANDLE ASSEMBLY
Filed May 3, 1946 — 2 Sheets-Sheet 2
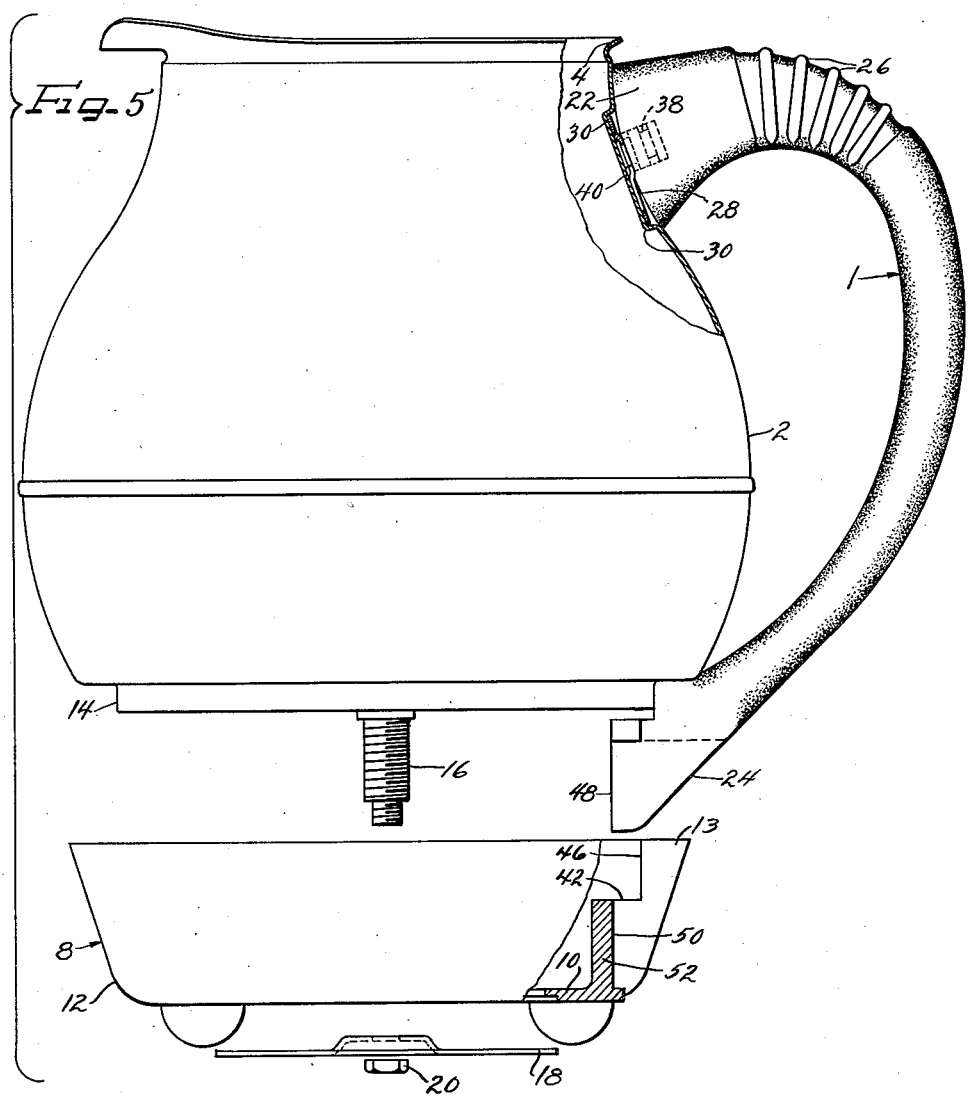
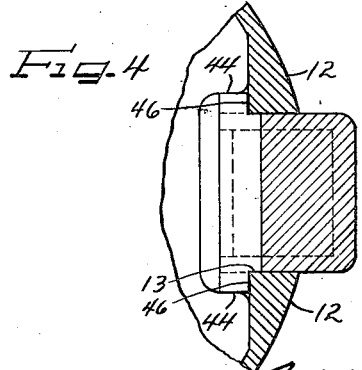
Inventor
Leland H. Snyder Patented Oct. 16, 1951

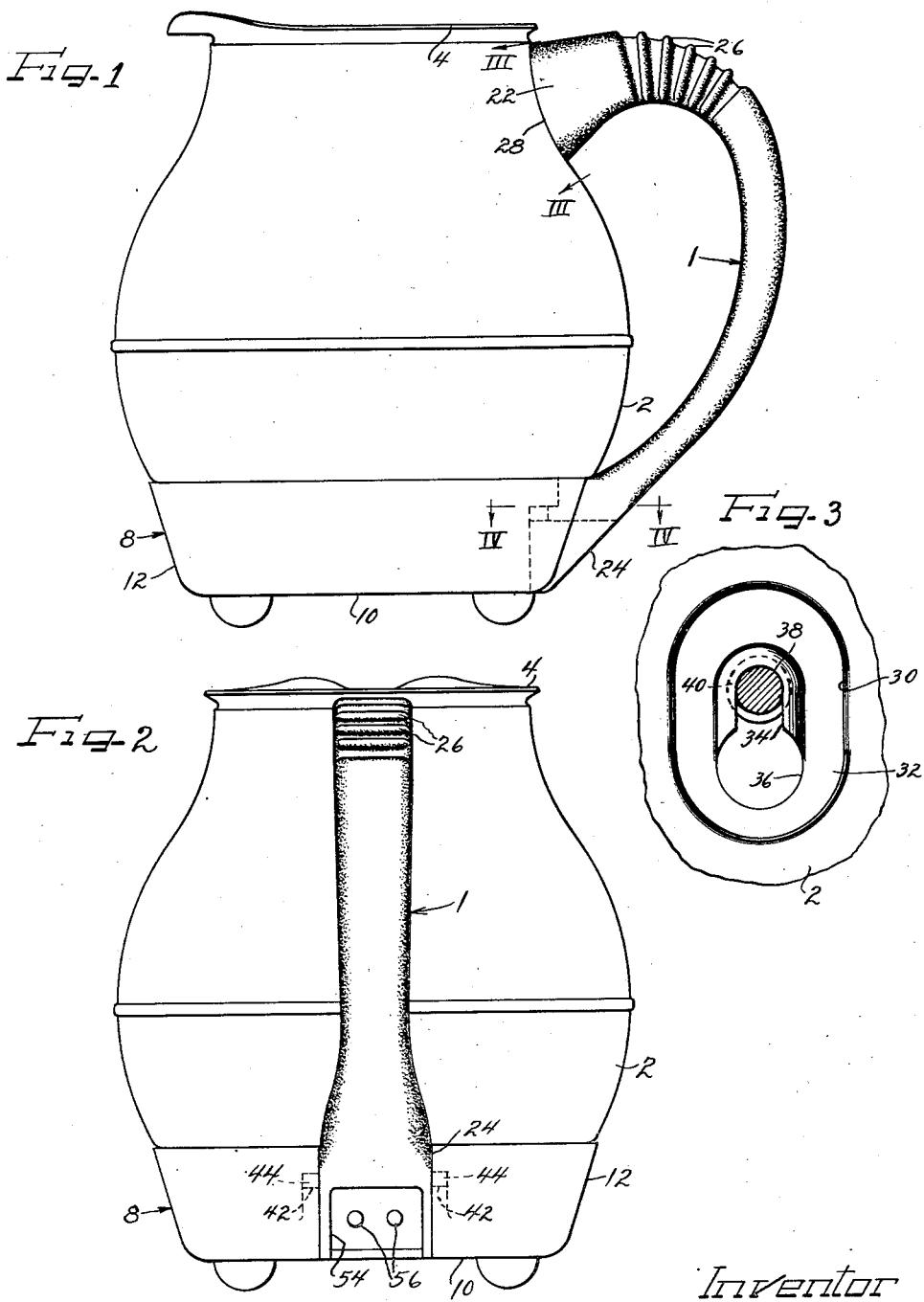

2,571,389

UNITED STATES PATENT OFFICE 2,571,389

HANDLE ASSEMBLY

Leland H. Snyder, Chicago, Ill., assignor, by mesne assignments, to Knapp-Monarch Company, St. Louis, Mo., a corporation of Delaware Application May 3, 1946, Serial No. 667,093

3 Claims. (Cl. 220—94)

This invention relates to a handle construction and particularly to a handle construction for cooking vessels or the like which are formed by two assembled parts.

There are many instances where the problem arises of providing a rigid, yet detachable connection of a handle to a container. In the case of fluid containers, and particularly in the case of coffee makers, it is undesirable to utilize any form of connection between the handle and the vessel which involves a piercing of the wall of the vessel. The difficulties involved in obtaining a permanent seal around the portion of the vessel wall which was apertured to accommodate the handle securing means are considered to be obvious.

In accordance with this invention, an improved handle construction is provided, particularly applicable to vessels formed by the assembly of at least two cooperating parts, which effects a rigid, yet detachable connection of the handle to the assembled vessel and does not require the piercing of any wall of the vessel. Accordingly, this invention finds particular application in connection with the securing of handles to coffee makers and will be illustrated in connection with such specific application; however, it should be strictly understood that the principles of this invention will find application to any device where the problem of securing a handle to the device arises.

Accordingly, it is an object of this invention to provide an improved handle construction.

A further object of this invention is to provide an improved handle construction particularly adapted for effecting a rigid, yet detachable connection of a handle to any vessel or device formed by assembly of at least two cooperating parts.

A particular object of this invention is to provide an improved handle construction for coffee makers.

The specific nature of this invention as well as other objects and advantages thereof will become apparent to those skilled in the art from the following detailed description of the annexed sheet of drawings which, by way of preferred example only, illustrate one specific embodiment of the invention.

On the drawings:

Figure 1 is an elevational view of a coffee maker unit including a handle construction in accordance with this invention.

Figure 2 is a side elevational view of Figure 1.

Figure 3 is a partial sectional view taken along the plane III—III of Figure 1.

Figure 4 is a partial sectional view taken along the plane IV—IV of Figure 1.

Figure 5 is an exploded view of the various elements which are assembled to form the construction of Figure 1.

As shown on the drawings:

A handle construction embodying this invention is illustrated on the drawings as applied to a coffee maker of the type shown and described in my copending application Serial No. 655,176, filed March 18, 1946. Reference may be had to this copending application for a detailed description of the coffee maker elements.

The coffee maker comprises a lower bowl 2 having a relatively wide, open top 4 in which an upper bowl (not shown) may be accommodated to provide a coffee maker of the well known associated upper and lower bowl type. The lower bowl 2 is preferably rigidly secured to and mounted on a base housing 8 which may constitute a molded plastic member having an annular base 10 and upstanding side wall portions 12 which are shaped to blend smoothly with the contour of the side walls of lower bowl 2.

The lower bowl 2 may be provided with an integrally formed, downwardly depending, cylindrical mounting portion 14 (Fig. 5) which, in the assembled relationship of the base housing 8 and lower bowl 2, fits snugly within the top portion of the side wall 12 of the base housing 8.

Base housing 8 may be secured to lower bowl 2 by any convenient means, such as by the provision of an exteriorly threaded post member 16 which is rigidly secured in depending relation in the center of the base of lower bowl 2. This post member 16 projects downwardly through the hollow central portion of base housing 8 and through a central opening provided in a retaining disk 18. Retaining disk 18 has peripheral engagement with the base portion 10 of base housing 8 and a nut 20 screwed onto the end of threaded post 16 secures base housing 8 to lower bowl 2.

In accordance with this invention, a handle 1 is provided comprising a generally bow-shaped member having its upper end 22 shaped to snugly engage against the neck portion of lower bowl 2 and its lower end 24 engageable in a complementarily shaped recess 13 provided in the side wall 12 of base housing 8. To improve the decorative appearance of handle 1, and to facilitate the grasping of the handle, a plurality of spaced, semi-peripheral ribs 26 may be integrally formed on handle 1 at a position near the top end portion 22. The end face 28 of the top end portion 22 of handle 1 is suitably shaped to conform to the adjacent surface of the neck portion of lower bowl 2. At a point underlying the end face 28 of handle 1, the wall of lower bowl 2 is deformed to provide an inwardly projecting indentation 30 which may have any desired peripheral configuration, such as the oval shape which is best shown in Figure 3. Within the indentation 30, a similarly shaped latching plate 32 is rigidly secured on the exterior side of the lower bowl 2, preferably by welding. Latching plate 32 has its central portion punched out and deformed to define a vertically extending slot 34. The bottom end portion of slot 34 is circularly enlarged as indicated at 36.

In the end face 28 of the top end of the handle 1, an attaching stud 38 is rigidly secured as by molding the stud into the handle, and a headed end portion 40 of stud 38 projects outwardly from the end face 28 of handle 1. The headed portion 40 of the stud 38 is insertable within the enlarged portion 36 of the slot 34. After the headed portion 40 is thus inserted, upward movement of the handle 1 relative to the lower bowl 2 will move the shank portion of the stud 38 up into the narrow portion of the slot 34 and thus effect a bayonet type lock between the upper end of the handle 1 and the lower bowl 2. It should be particularly noted that the handle 1 is thus secured to the lower bowl 2 without requiring any piercing of the wall of the lower bowl; accordingly, there is no problem of preventing eventual leakage through an aperture in the side wall of the lower bowl 2.

The handle 1 therefore can be detached from the lower bowl 2 only by downward relative movement of the handle 1 relative to the lower bowl. To prevent such movement, and hence achieve a rigid assembly of the handle 1 to the coffee making unit, the bottom end 24 of handle 1 is snugly receivable in the recessed portion 13 of the side wall 12 of base housing 8. An integral, upwardly facing shoulder 42 is defined on each side of the recess 13. The bottom end 24 of handle 1 is provided with a pair of opposed transverse projections 44 which, in the assembled position of the base housing, lower bowl and handle, rest upon the upwardly facing shoulders 42. Thus downward movement of the handle 1 relative to the lower bowl is eliminated when the base housing is secured to the lower bowl by tightening of the nut. The transverse projections 44 also cooperate respectively with inwardly facing vertical shoulders 46 provided on the side wall 12 on each side of the recess 13. Thus, in effect, the bottom end portion 24 of handle 1 is secured to base housing 8 by a dovetail joint. Thus, all lateral movement of the handle 1 relative to the base housing 8 is effectively prevented when the base housing 8 is assembled to the lower bowl 2. The end face 48 of the bottom end portion 24 of handle 1 abuts against an outwardly facing vertical shoulder 50 provided by an integrally formed, upstanding rib 52 in the base housing 8 which runs across the recess 13.

If desired, the bottom portion 24 may be provided with a recess 54 which permits an electrical connection plug (not shown) to be inserted therein to engage outlet prongs 56 of the coffee maker.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a coffee maker, a fluid container, a base for supporting said container, means for securing said base to said container, a generally bow shaped handle for said coffee maker, said container having a plate secured on the exterior thereof, said plate having a slot-like aperture therein having one portion thereof enlarged, a headed stud secured to one end of said handle and projecting outwardly therefrom, said headed stud being insertable into the enlarged portion of said slot and movable into the smaller portion of said slot to detachably secure said handle to said container, the other end of said handle being rectangularly shaped and provided with side projections, said base having a recess therein complementarily shaped to receive the other end of said handle to secure said handle at said other handle end in interlocked relation between said base and said container when said base and container are assembled, thereby preventing movement of said handle in a direction to move said headed stud into said enlarged slot portion.

2. In a coffee maker, a fluid container, a base for supporting said container, means for securing said base to said container, a handle for said coffee maker, said container having a plate secured on the exterior thereof, said plate having a slot therein having one portion thereof enlarged, a headed stud secured to one end of said handle and projecting outwardly therefrom, said headed stud being insertable into the enlarged portion of said slot and movable into the smaller portion of said slot to detachably secure said handle to said container, the other end of said handle having a pair of laterally extending projections, said base having a recess therein conformingly shaped to receive said handle end and having portions cooperating with said projections to lock said handle end between said base and said container when said base and container are assembled, thereby preventing movement of said handle in a direction to move said headed stud into said enlarged slot portion.

3. In combination, a two-part assembled unit, a handle for said unit, one end of said handle and one part of said assembly unit having elements cooperating to provide a bayonet type connection therebetween, the other end of said handle having a generally rectangular shape, said handle having a curved shape and length to permit said other end to snugly fit below the bottom edge of said one part, a pair of projections disposed on opposite sides of said rectangularly shaped handle end, the other of said parts having a rectangular recessed side portion shaped to snugly accommodate said rectangular handle end, said recess having a cutaway portion on its top side edges to snugly accommodate said handle projections whereby said other handle end is interlocked between said two parts and said handle is fixed to said unit.

LELAND H. SNYDER.

REFERENCES CITED

The following references are of record in the file of this patent:

UNITED STATES PATENTS

| Number | Name | Date |
|---|---|---|
| 237,505 | Eason | Feb. 8, 1881 |
| 582,439 | Smith | May 11, 1897 |
| 653,863 | Dunlap | July 17, 1900 |
| 808,766 | Lehmann | Jan. 2, 1906 |
| 2,143,432 | Campbell | Jan. 10, 1939 |
| 2,373,917 | Ross | Apr. 17, 1945 |

FOREIGN PATENTS

| Number | Country | Date |
|---|---|---|
| 7,552 | Great Britain | 1902 |
| 146,055 | Switzerland | June 1, 1931 |